United States Patent [19]
Nathan

[11] Patent Number: 5,438,796
[45] Date of Patent: Aug. 8, 1995

[54] LABEL IDENTIFIED PLANTER

[76] Inventor: Melvin A. Nathan, 5809 Lafayette Ave., Newark, Calif. 94560-2526

[21] Appl. No.: 151,121

[22] Filed: Nov. 12, 1993

[51] Int. Cl.⁶ ............................................. A01G 9/02
[52] U.S. Cl. ............................................. 47/66; 47/87
[58] Field of Search ............................. 47/66 C, 87

[56] References Cited

U.S. PATENT DOCUMENTS

| | | | |
|---|---|---|---|
| 2,302,045 | 11/1942 | Neumann et al. | 47/87 |
| 2,867,946 | 1/1959 | Kobs | 47/87 |
| 3,707,806 | 1/1973 | Toews et al. | 47/87 |
| 3,931,694 | 1/1976 | Krikorian | 47/87 |
| 4,067,143 | 1/1978 | Alwell | 47/79 |
| 4,117,631 | 10/1978 | Tull | 47/81 |
| 4,387,534 | 6/1983 | Lewandowski et al. | 47/66 C |

FOREIGN PATENT DOCUMENTS

| | | | |
|---|---|---|---|
| 2642266 | 8/1990 | France | 47/66 C |
| 2263052 | 7/1993 | United Kingdom | 47/66 C |

*Primary Examiner*—Ramon S. Britts
*Assistant Examiner*—Joanne C. Downs

[57] ABSTRACT

A planter having a label which may be utilized for identifying the plant or seedling present within the soil of the planter. The planter includes a container having a flange extending around the top end on which the label is positioned. The label may be either an integrally molded writable surface or an adhesive attached writable surface. A plurality of labeled positions are disclosed and an alternate embodiment of the present invention includes a moisture indicator for identifying the presence of liquid within the soil.

7 Claims, 4 Drawing Sheets

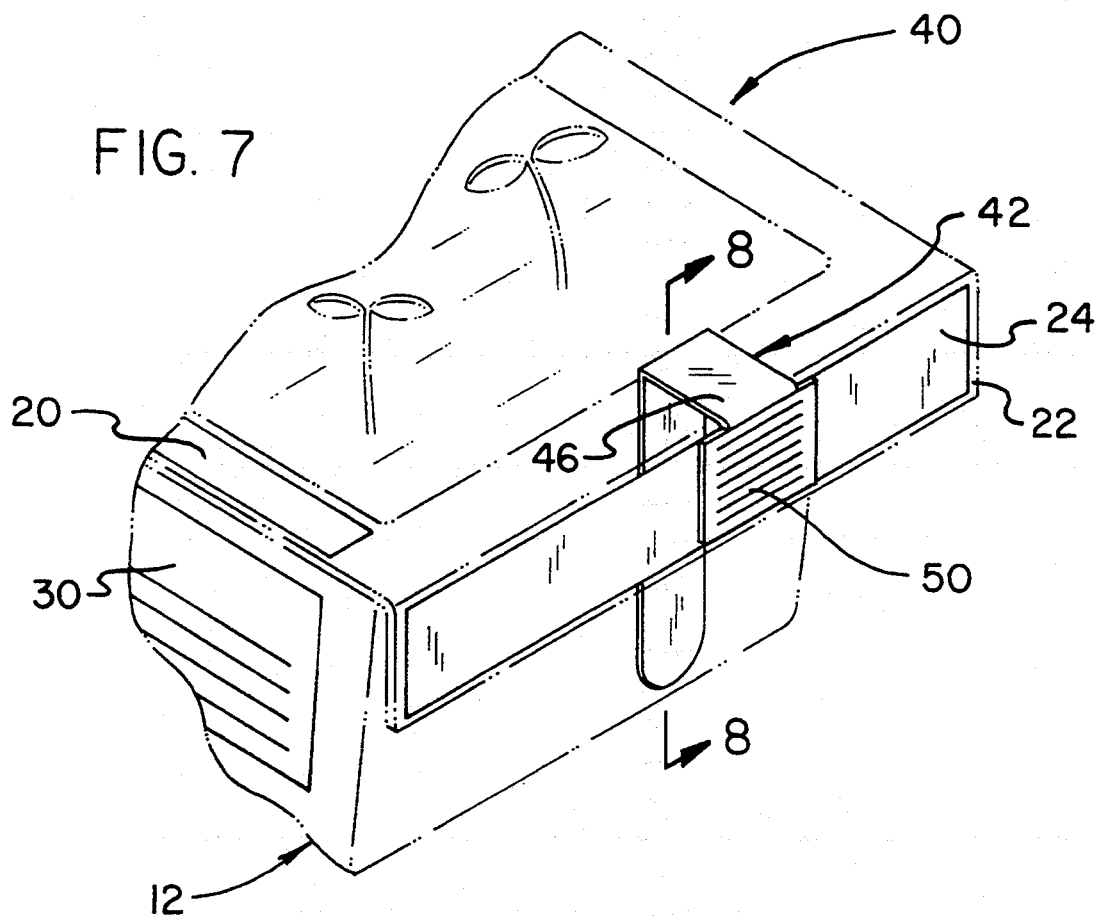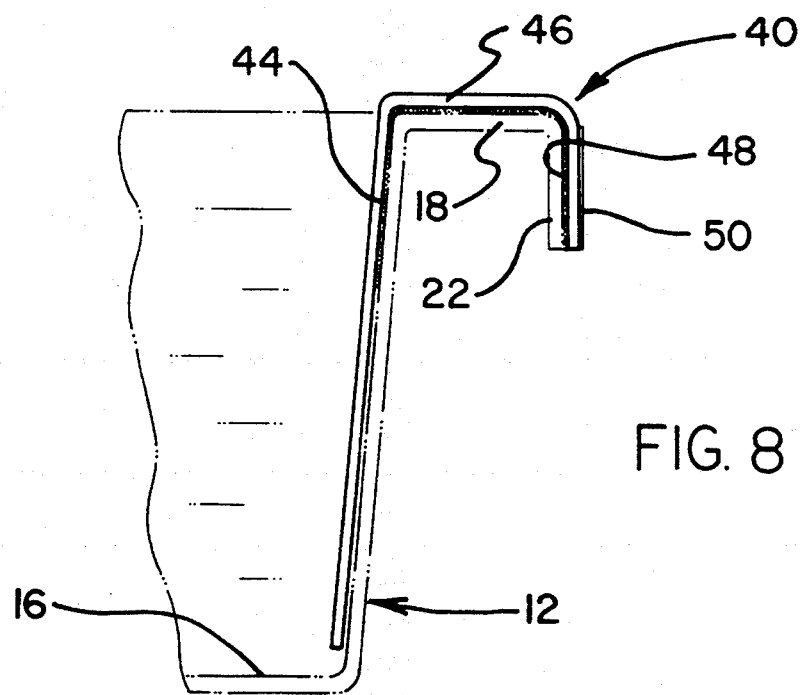

LABEL IDENTIFIED PLANTER

BACKGROUND OF THE INVENTION

1. Field of the Invention

The present invention relates to planters and more particularly pertains to a planter having a label which may be utilized for identifying the plant or seedling present within the soil of the planter.

2. Description of the Prior Art

The use of planters is known in the prior art. More specifically, planters heretofore devised and utilized for the purpose of containing soil and seedlings or plants are known to consist basically of familiar, expected and obvious structural configurations, notwithstanding the myriad of designs encompassed by the crowded prior art which have been developed for the fulfillment of countless objectives and requirements.

More specifically, most plants or seedlings are identified by labels or tags which attach either directly to the plant itself, or are inserted into the soil adjacent to the identified plant or seedling. It is common for such labels or tags to be unintentionally or accidentally removed or rearranged, thereby rendering the associated plant or seedling unidentifiable until sometime after the purchase thereof by a consumer and/or the planting thereof in the ground. Such tags and labels are known in the prior art and several patents have issued therefor.

For example, a plant tag is illustrated in U.S. Pat. No. 4,379,372 which utilizes a resilient tag portion having first and second holes formed therethrough. Guide notches are provided at exposed edges of the tag portion on either side of a scored line and cuts extend from each of the first and second holes to a guide surface on the same side of the scored line. The tag is foldable about the scored line to align the first and second holes such that the guide surfaces may guide the tag onto the plant. The resilient tag may then be unfolded to lock the tag onto the plant.

A plant coding system is described in U.S. Pat. No. 4,972,616 which includes a plant wall chart color coded according to groups of plants requiring certain amount of sun light, cards similarly color coded and located at the display area for plants of a similar variety, and plant tags associated with each tag and color coded to correspond to the light required and shown also on the card. The plant tags include a rectangularly shaped area for displaying the information required which tapers into a spike that may be inserted into the soil adjacent the associated plant.

Another patent of interest is U.S. Pat. No. 4,196,533 which discloses a plant marker including a plastic stake element having a sharpened point at one end thereof and an enlarged planar mounting surface at the opposite end thereof. An identification number such as a decal is removably applied to the mounting surface and serves to identify plants by means of graphic information or indicia or both. Various identification numbers can be purchased separately according to different variety of plants which the user intends to grow, and a selected member is affixed to a stake element which is then driven by hand into the ground adjacent to the plant or seedling to be identified.

While these devices fulfill their respective, particular objectives and requirements, the aforementioned patents do not describe a planter having a label that may be utilized for identifying the plant or seedling present within the soil of the planter which includes a container having a flange extending around the top end thereof on which the label is positioned. Furthermore, none of the known prior art planters teach or suggest a planter having an integrally molded writable surface thereon and a moisture indicator for identifying a presence of liquid within the soil of the planter.

In these respects, the label identified planter according to the present invention substantially departs from the conventional concepts and designs of the prior art, and in so doing provides an apparatus primarily developed for the purpose of containing a plant or seedling and identifying the plant or seedling present within the soil of the planter.

SUMMARY OF THE INVENTION

In view of the foregoing disadvantages inherent in the known types of planters now present in the prior art, the present invention provides a new label identified planter construction wherein the same can be utilized for identifying the plant or seedling present within the soil of the planter. As such, the general purpose of the present invention, which will be described subsequently in greater detail, is to provide a new label identified planter apparatus which has many of the advantages of the planters mentioned heretofore and many novel features that result in a label identified planter which is not anticipated, rendered obvious, suggested, or even implied by any of the prior art planters, either alone or in any combination thereof.

To attain this, the present invention essentially comprises a planter having a label which may be utilized for identifying the plant or seedling present within the soil of the planter. The planter includes a container having a flange extending around the top end on which the label is positioned. The label may be either an integrally molded writable surface or an adhesive attached writable surface. A plurality of labeled positions are disclosed and an alternate embodiment of the present invention includes a moisture indicator for identifying the presence of liquid within the soil.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new label identified planter apparatus which has many of the advantages of the planters mentioned heretofore and many novel features that result in a label identified planter which is not anticipated, rendered obvious, suggested, or even implied by any of the prior art planters, either alone or in any combination thereof.

It is another object of the present invention to provide a new label identified planter which may be easily and efficiently manufactured and marketed.

It is a further object of the present invention to provide a new label identified planter which is of a durable and reliable construction.

An even further object of the present invention is to provide a new label identified planter which is susceptible of a low cost of manufacture with regard to both materials and labor, and which accordingly is then susceptible of low prices of sale to the consuming public, thereby making such label identified planters economically available to the buying public.

Still yet another object of the present invention is to provide a new label identified planter which provides in the apparatuses and methods of the prior art some of the advantages thereof, while simultaneously overcoming some of the disadvantages normally associated therewith.

Still another object of the present invention is to provide a new label identified planter having a label which may be utilized for identifying the plant or seedling present within the soil of the planter.

Yet another object of the present invention is to provide a new label identified planter which includes a container having a flange extending around the top end thereof on which the label is positioned, such label being either an integrally molded writable surface or an adhesive attached writable surface.

Even still another object of the present invention is to provide a new label identified planter which includes a moisture indicator for identifying the presence of liquid within the associated soil of the planter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an enlarged perspective view of a portion of a second embodiment of a label identified planter comprising the present invention.

FIG. 8 is a cross sectional view taken along line 8—8 of FIG. 7.

DESCRIPTION OF THE PREFERRED EMBODIMENT

Figure 1:
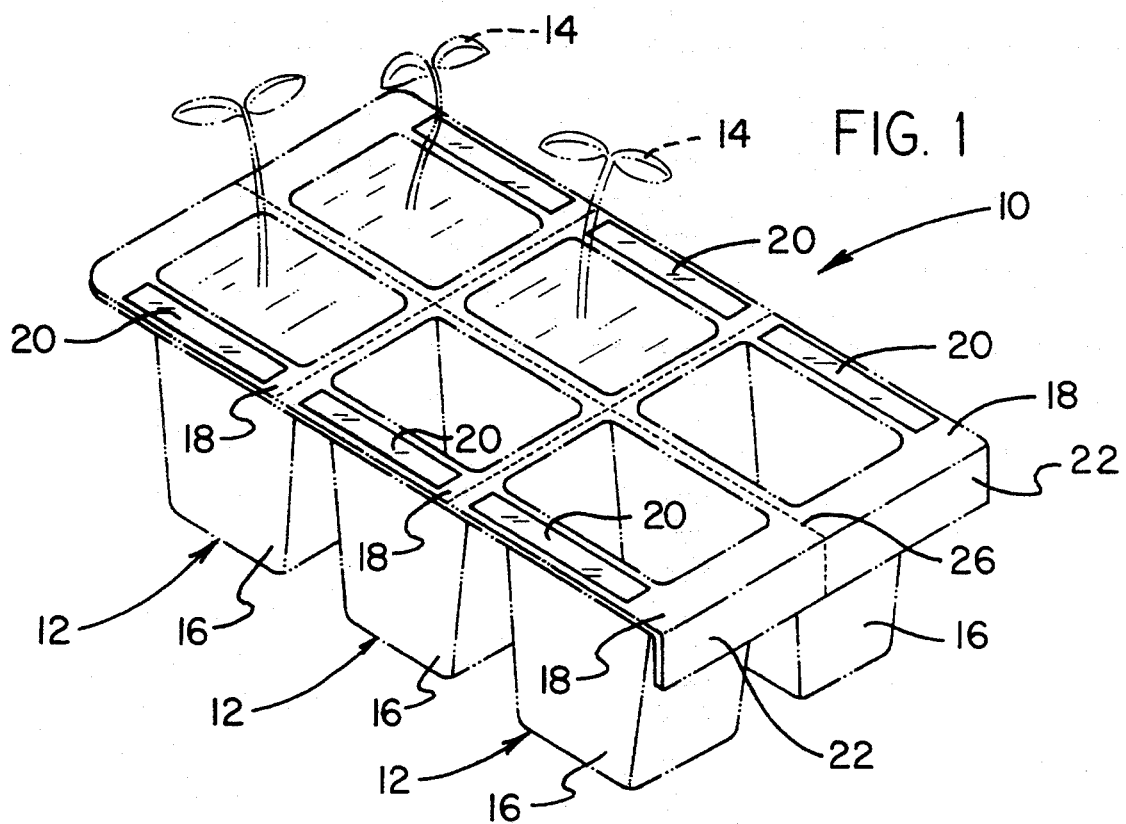
FIG. 1 is a perspective view of a first embodiment of label identified planters removably coupled together.

With reference now to the drawings, and in particular to FIGS. 1-6 thereof, a first embodiment of a label identified planter embodying the principles and concepts of the present invention and generally designated by the reference numeral 10 will be described.

From an overview standpoint, the label identified planter 10 comprises a planter 12 into which a plant 14 and its associated soil may be placed. The planter 12 includes a container 16 having a closed bottom end and an open top end around which top end a flange 18 circumscribes. The flange 18 includes a label 20 onto which appropriate plant identifying indicia may be written, stamped or otherwise placed thereon to identify the plant 14 contained within the planter 12. The label 20 may comprise either a writable surface which is integrally molded into the flange 18, or an adhesive attached writable surface coupled to the flange. In either case, the flange 18 extends outwardly from the container 16 a sufficient distance to provide for accommodation of the label 20 thereon.

In use, the label 20 may be provided with appropriate plant identifying indicia corresponding to the plant 14 contained within the planter 12. Because the label 20 is securely or permanently attached to the flange 18, separation of the label from the associated planter 12 is not possible. Therefore, accidental removal of the label 20 and its associated plant identifying indicia which would render the plant 14 unidentifiable, is substantially reduced.

More specifically, it will be noted that the label identified planter 10 comprises a planter 12 for receiving and supporting a plant 14 and its associated soil in a conventional manner. The planter 12 comprises a substantially rectangularly shaped container 16 having a closed bottom end and an open top end. A horizontally extending flange 18 extends outwardly from the top end of the container 16 and circumscribes a perimeter thereof. The flange 18 includes an area of sufficient space to accommodate a label 20 thereon, as best illustrated in FIGS. 1 and 2.

Figure 2:
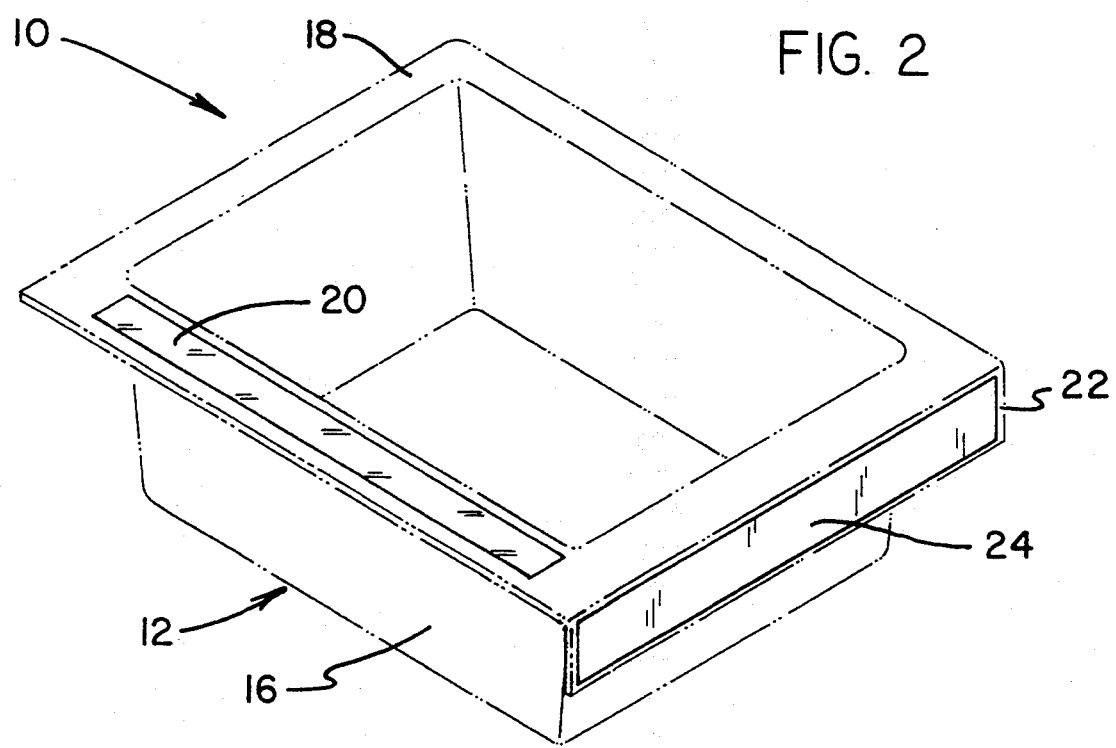
FIG. 2 is an enlarged perspective view of the present invention.

Additionally or alternatively, the flange 18 may include a downwardly extending lip 22, as illustrated in FIG. 2, which is useful for grasping and manipulating the planter 12 and is also useful to accommodate a lip label 24. The lip label 24 may contain similar or other plant identifying indicia as displayed by the other label 20, such that the indicia may be readily viewed from a lateral position as well. The downwardly extending lip 22 and the associated lip label 24 allow a user to identify the contents of the planter 12 from the side of a shelf, work table, or the like.

The planters 12 may be integrally molded from a plastic material or the like and may include drain holes and other water channeling features within the closed bottom end of the container 16. In addition, a plurality of such planters 12 may be integrally molded together as illustrated in FIG. 1. Perforations 26 may be provided to facilitate a subsequent separation of each individual planter 12 from an adjacent planter.

Figure 3:
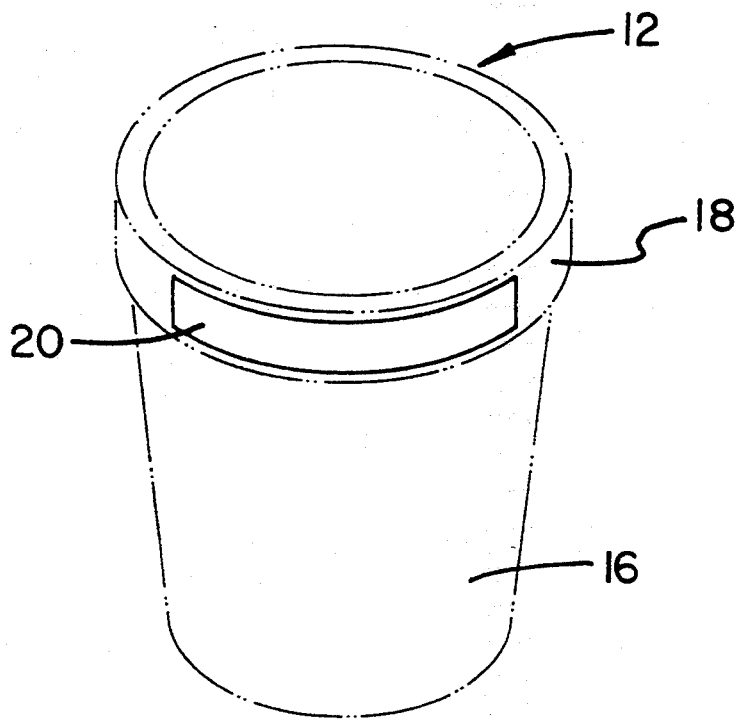
FIG. 3 is an enlarged perspective view of the invention.

FIG. 3 illustrates a variation in the shape in the container 16 and it can be seen from this figure that the planter 12 may be formed into a substantially cylindrical container 16 which is slightly tapered so as to be nestable within similarly constructed planters. The container 16 as illustrated in FIG. 3, similarly includes a closed bottom end and an open top end around which the flange 18 circumscribes. The flange 18 similarly accommodates the label 20 for identifying the plant 14 or seedling present within the planter 12. Such planters 12 may be integrally molded together in an adjacent manner with small unillustrated tabs connecting adjacent planters together.

Figure 4:
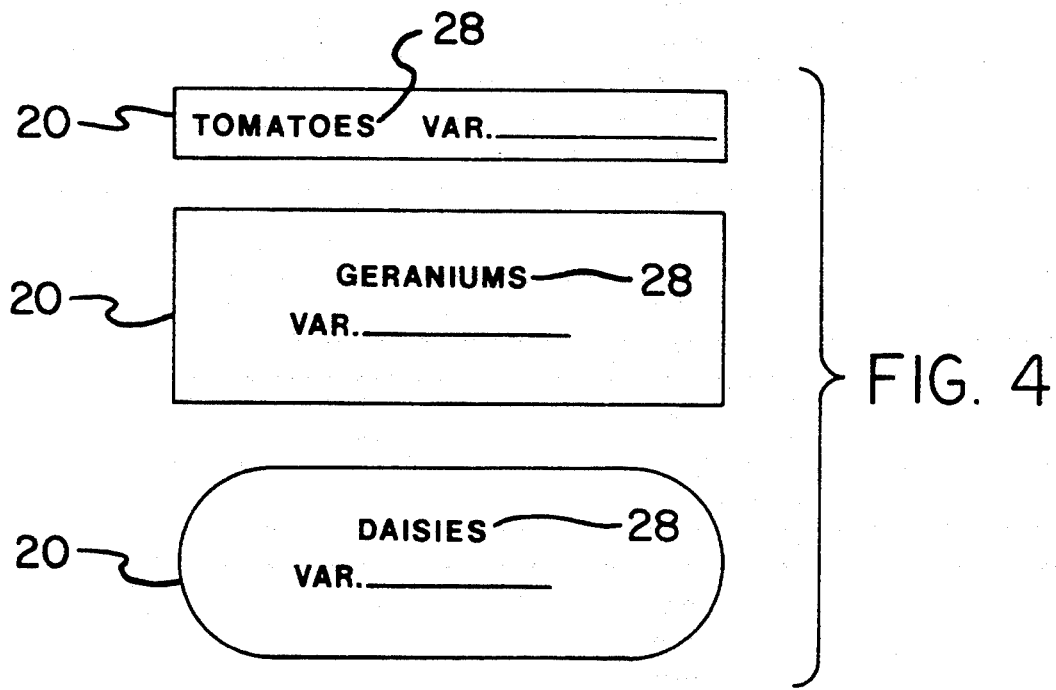
FIG. 4 is a front elevation view of a portion of the invention.

FIG. 4 illustrates several examples of possible indicia 28 which may be positioned on either of the label 20 or the lip label 24. Such illustration is provided for only the label 20 with it being understood that the lip label 24 may contain similar indicia thereon.

The labels 20, 24 may comprise a writable surface which is integrally molded into the flange 18 or the downwardly extending lip 22, respectively. Such writable surface may comprise a textured plastic capable of receiving ink, graphic or other marking means and may also be of a color contrasting that of the flange 18 as to facilitate easy identification thereof. Additionally or alternatively, the labels 20, 24 may comprise a self adhesive writable surface formed of a paper or similarly textured material capable of receiving conventional marking needs. In either case, the labels 20, 24 should comprise a writable surface which has a substantial resistance to water and other fluids which may be dispensed upon the plant 14 contained within the planter 12.

Figure 5:
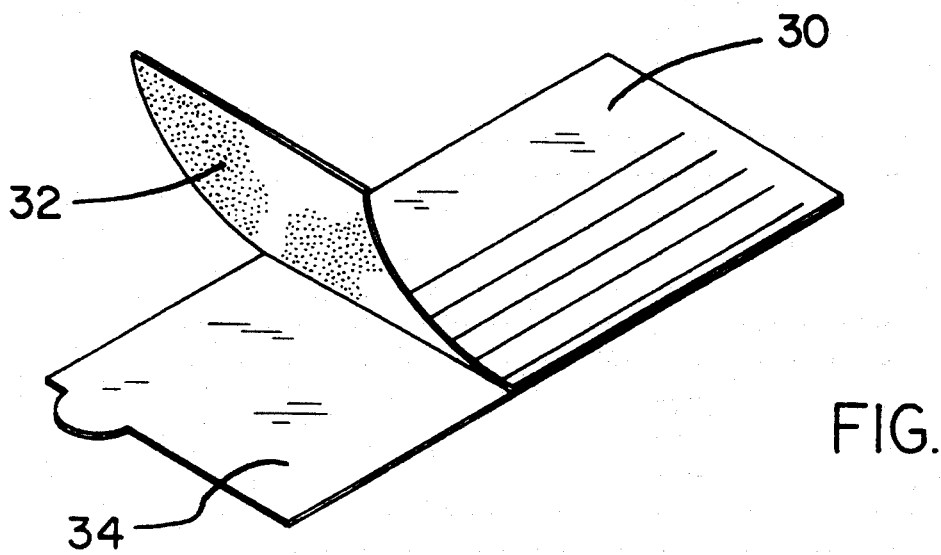
FIG. 5 is a perspective view of a further portion of the invention.
Figure 6:
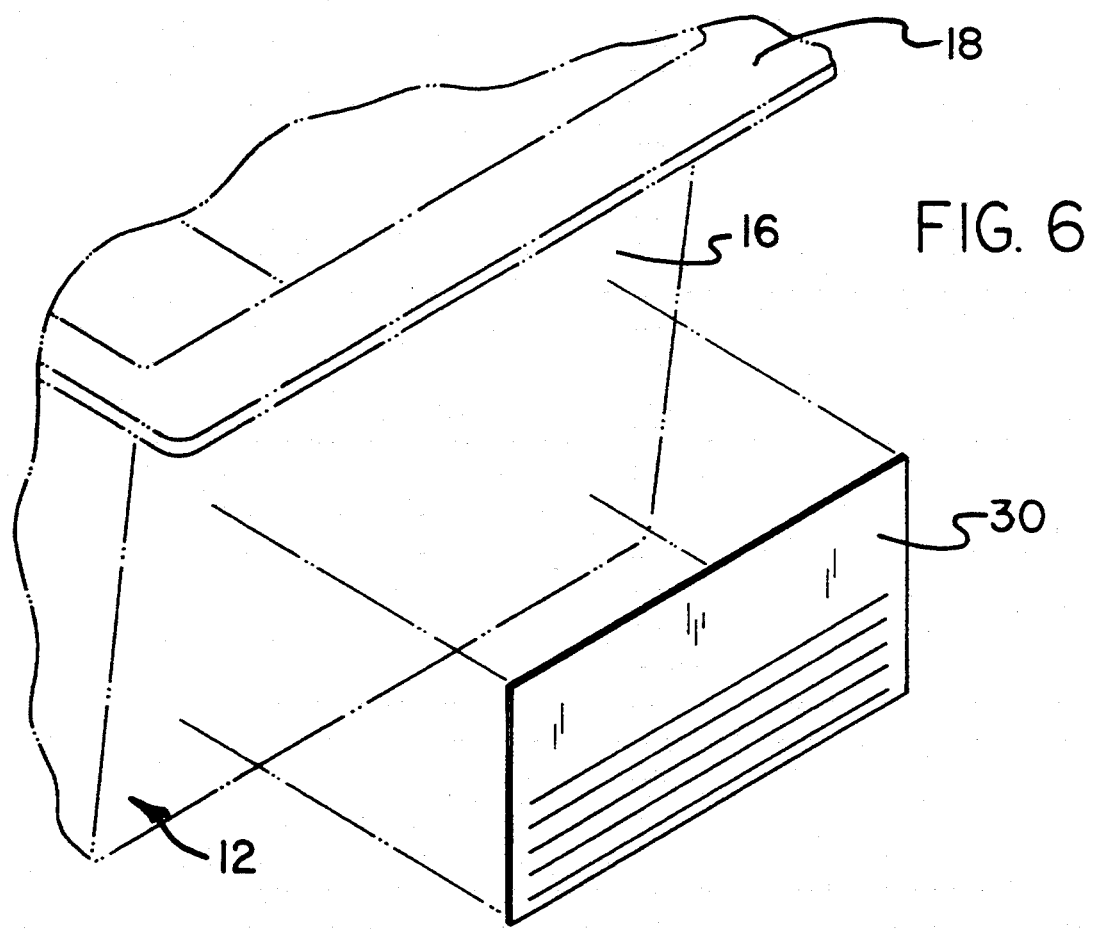
FIG. 6 is an enlarged perspective view, partially exploded of the first embodiment.

In addition to the above described structure, the planter 12 may include a container label 30 which may be applied to a portion of the container 16, as best illustrated in FIGS. 5 and 6. The container label 30 includes a writable surface having an adhesive 32 applied to a back surface thereof. A removable backing 34 may be separated from the adhesive 32 to expose such adhesive for subsequent application to the container 16. The container label 30 may contain additional information relating to the plant 14 contained within the planter 12, such as watering instructions, care instructions, and the like.

In use, the labels 20, 24, 30 may be provided with appropriate plant identifying indicia and/or instructions corresponding to the plant 14 contained within the planter 12. Because the labels 20, 24, 30 are securely or permanently attached to the planter 12, separation of any of the labels from the associated planter 12 is not possible. Therefore, accidental removal of the labels 20, 24, 30 and its associated plant identifying indicia which would render the plant unidentifiable, is substantially reduced.

A second embodiment of the present invention, as generally designated by the reference numeral 40, which comprises substantially 11 of the features and structure of the foregoing embodiment 10 and which further comprises a moisture indicator 42 will now be described. As best shown in FIGS. 7-8, it can be shown that the moisture indicator 42 comprises a water permeable wick 44 which extends from a horizontal visible area 46 into a vertical position both upon the downwardly extending lip 22 and into the container 16, as best illustrated in FIG. 8.

The water permeable wick 44 is secured to the container 16, the flange 18, and the downwardly extending lip 22 by conventionally known adhesive 48. The wick 44 is constructed of a material which absorbs water and is colored such that the appearance of the wick when wet is darker than the appearance of the wick when dry. The wick extends into the container 16 and into contact with the associated soil contained within the planter 12 such that water contained within the soil may be absorbed by the wick. By this structure, a user may ascertain the approximate moisture contained within the soil by viewing the visible area 46 of the wick 44 or, alternatively, touching the visible area 46 to feel if the wick is damp. Should the soil contain sufficient moisture, the visible area 46 of the wick 44 will appear dark in color and be wet to the touch. Should the soil not contain a sufficient amount of moisture, the wick 44 will appear light in color and be dry to the touch.

In addition, the moisture indicator 42 may be provided with moisture indicator instructional indicia 50 which explains the above described moisture detecting procedure to a user.

The planter 12 illustrated in FIG. 7 includes the horizontally positioned label 20 which may be viewed from a vertical vantage point, the lip label 24 which may be viewed from a horizontal vantage point, the container label 30 which may be utilized to display appropriate plant care instructions, the moisture indicator 42 for determining the approximate moisture content of the soil contained therein, and moisture indicator instructional indicia 50 which instructs a user on the appropriate use of the moisture indicator such that all advantages of the present invention are obtained.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new label identified planter comprising:
   a container having a closed bottom and an open top end;
   a substantially horizontally extending flange coupled to and extending around said top end and outwardly therefrom;
   a label means positioned on said flange for receiving and displaying indicia;
   a downwardly extending lip substantially orthogonally connected to said flange; and
   a lip label means attached to said downwardly extending lip for receiving and displaying indicia.

2. The new label identified planter of claim 1, wherein said label means and said lip label means each comprise an integrally molded writable surface.

3. The new label identified planter of claim 2, and further comprising a moisture indicator means for approximately indicating an amount of moisture present within said planter.

4. The new label identified planter of claim 3, wherein said moisture indicator means comprises a water permeable wick positioned partially within said container, said wick being operable to darken when exposed to water, said wick further being operable to feel wet when exposed to water.

5. The new label identified planter of claim 4, and further comprising moisture indicator instructional indicia coupled to said wick.

6. The new label identified planter of claim 5, wherein a plurality of said planters are integrally molded together and separable along perforated portions thereof.

7. The new label identified planter of claim 6, wherein said container is substantially rectangularly shaped.

* * * * *